United States Patent [19]

Lowman, Jr.

[11] 4,074,859

[45] Feb. 21, 1978

[54] DEFORMABLE PLUG FOR AN AIRCRAFT ENGINE EXHAUST NOZZLE

[75] Inventor: Richard M. Lowman, Jr., Hartsville, S.C.

[73] Assignee: The United States of America as represented by the Secretary of the Air Force, Washington, D.C.

[21] Appl. No.: 740,517

[22] Filed: Nov. 10, 1976

[51] Int. Cl.² ............................................. B64C 15/00
[52] U.S. Cl. .................................. 239/265.33; 60/230
[58] Field of Search ..................... 239/265.19, 265.13, 239/265.33, 265.37, 265.39, 265.41; 60/229, 232, 228, 230; 244/53 R

[56] References Cited

U.S. PATENT DOCUMENTS

| | | | |
|---|---|---|---|
| 2,938,335 | 5/1960 | Cook, Jr. | 239/590.5 X |
| 3,237,864 | 3/1966 | Taylor et al. | 239/265.41 X |
| 3,352,494 | 11/1967 | Colville et al. | 239/265.33 X |
| 3,774,868 | 11/1973 | Goetz | 239/265.19 X |

*Primary Examiner*—Robert W. Saifer
*Assistant Examiner*—Michael Mar
*Attorney, Agent, or Firm*—Joseph E. Rusz; Jacob N. Erlich

[57] ABSTRACT

A deformable plug for use within an aircraft engine exhaust nozzle system having thrust vectoring and thrust reversing capability, as well as the capability to vary the nozzle area thereby improving propulsion efficiency. This invention utilizes an exhaust nozzle passageway having a rectangular nozzle exit area with the aerodynamically shaped plug centrally located in the path of the engine exhaust gases. The portion of the plug extending aft of the nozzle exit plane comprises of a pair of oppositely facing flaps that can be actuated to provide thrust vector and thrust reversal control as desired. The portion of the plug extending forward of the nozzle exit plane provides for variable throat area control.

6 Claims, 4 Drawing Figures

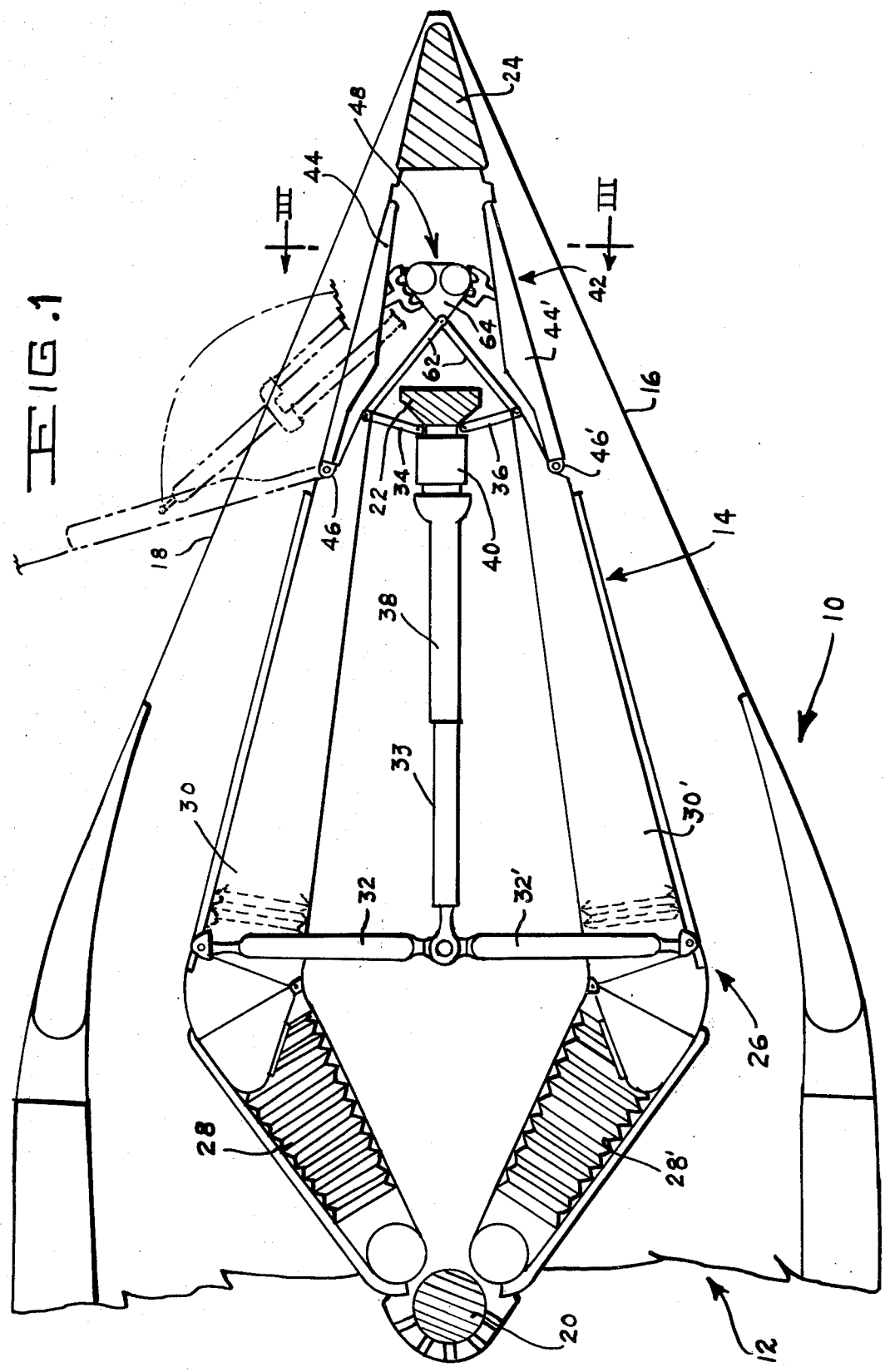

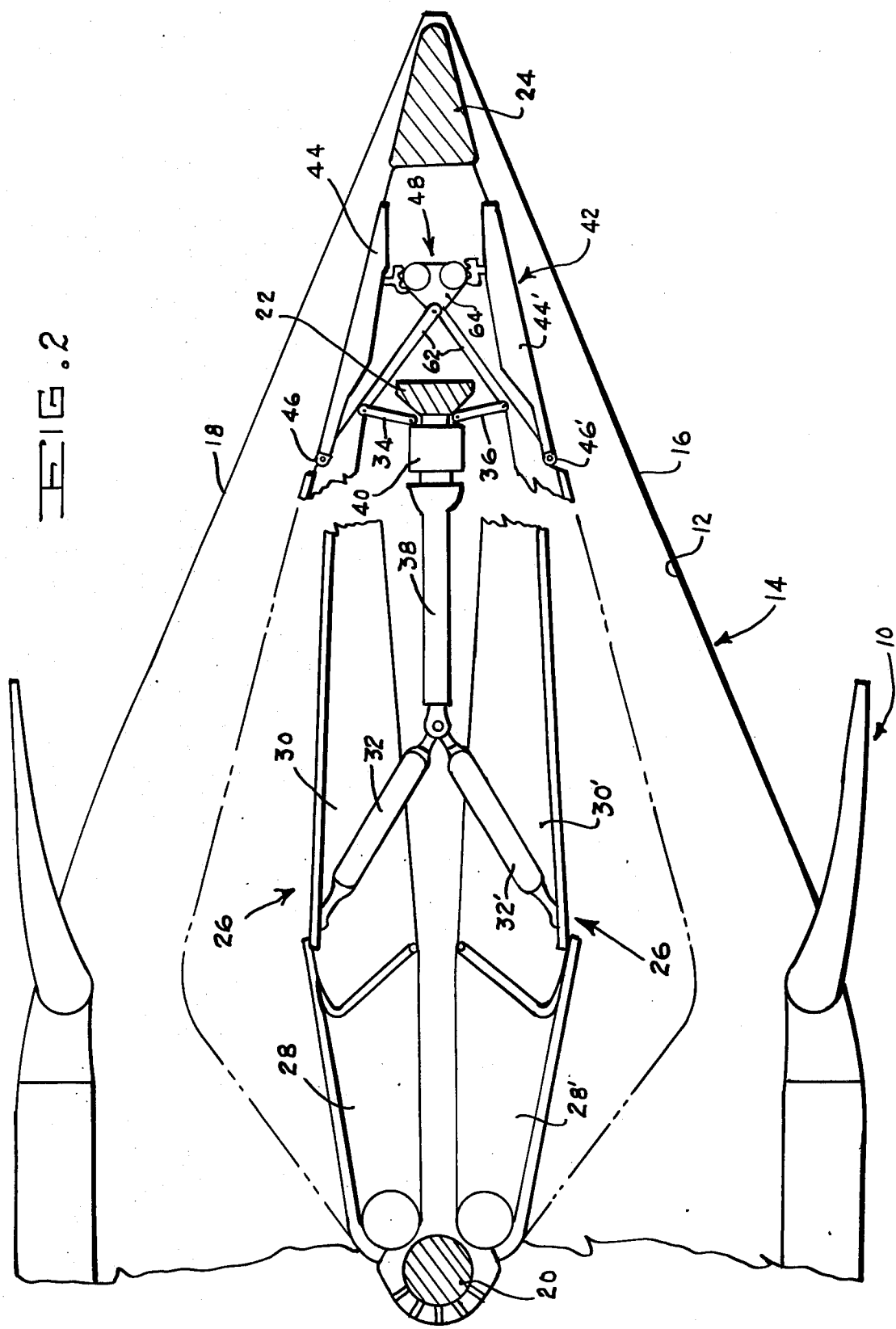

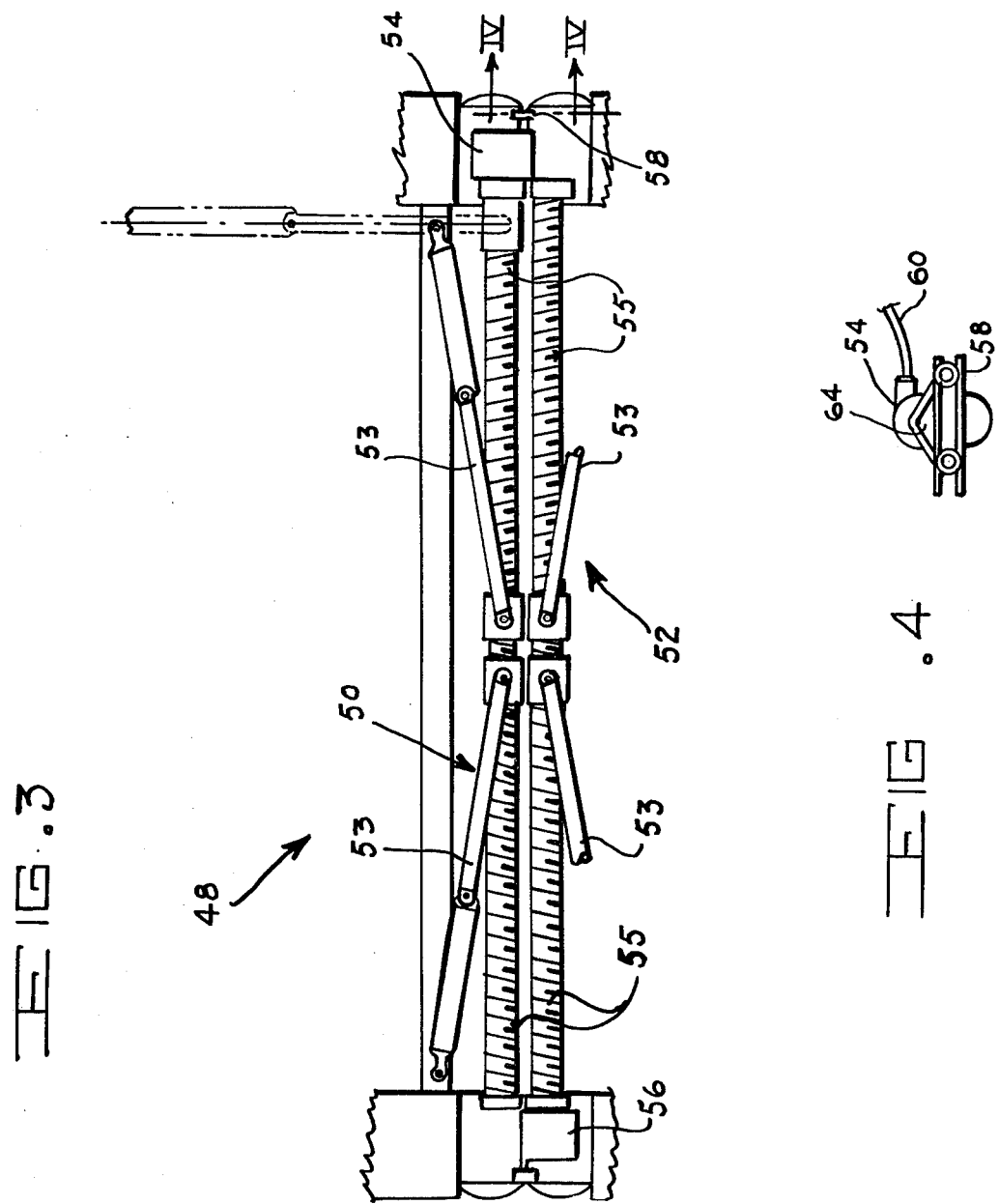

DEFORMABLE PLUG FOR AN AIRCRAFT ENGINE EXHAUST NOZZLE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to an aircraft engine exhaust nozzle system, and, more particularly to an aerodynamically-shaped deformable plug centrally located in the path of the engine exhaust gases, the plug having forward and rear fairings actuated by a simplified actuation system.

Jet engines are usually made up of a tubular housing or duct and contains therein an intake orifice, a combustion chamber, and an exhaust nozzle aft of the combustion chamber having a restricted orifice commonly known as the throat.

It has been found that varying the exhaust nozzle throat area enables an engine to maintain the design airflow with an increased fuel flow thereby increasing the engine thrust range. Likewise varying the inlet orifice area produces a more flexible control of the airflow so that it may be adjusted to variable flight conditions. A jet engine having these orifices variable, then, has the advantages of increased thrust range, increased upper altitude limit of operation, and more efficient variable Mach number flight.

It is also highly desirable to be able to control effective thrust in flight. This is particularly so in the case of tactical military airplanes, which may be required to decelerate rapidly in combat maneuvers or limit their speed in steep dives in bombing operations. Conventionally, speed brakes are used for this purpose.

Various types of thrust reversers have been in use for many years primarily to reduce landing run, although some have been successfully used in flight to reduce forward speed more rapidly than by throttling the engine. All of them utilize a basic principle of blocking the rearward flow of the exhaust gas stream and diverting it laterally. If the stream has no forward component it will act in the manner of a speed brake by interference with the free airstream. Normally, however, the stream is directed substantially forwardly to produce an actual reverse thrust. One common type uses a pair of deflectors which meet externally behind the nozzle to divert the stream laterally in opposite directions, usually with a forward component. Another similar type has doors mounted within the nozzle to block flow, lateral openings in the nozzle, and doors or reflectors which normally cover these openings, but may be swung outward to uncover the openings and direct the diverted streams laterally and forwardly. In another type, doors within the nozzle may be moved to block flow, and cascade passages are uncovered in the sidewalls to allow the gas to issue laterally and forwardly. Such a related device has been described in U.S. Pat. No. 3,774,868.

The major problem associated with the devices of the past for varying the thrust capabilities of a jet engine has been the highly complex nature of the mechanisms involved in the actuation of the device, and, as a result thereof the unreliable operation of the overall system.

SUMMARY OF THE INVENTION

The instant invention is in the form of a deformable plug centrally disposed within the exhaust nozzle of a jet engine. The deformable plug contains a plurality of control panels which form the forward fairing of the plug as well as a pair of flaps which constitute the rear fairing thereof. A simplified actuation system made up of an actuation linkage, jackshaft and jackshaft gear box assembly controls the forward fairing while a dual ball-nut and clevis rod assembly driven by a jackshaft reduction gear drive assembly controls the movement of the flaps of the rear fairing.

The nozzle exit area control is obtained by the actuation of the forward fairing while the thrust vector control is accomplished by independent actuation of the flaps. Thrust reversing is accomplished by simultaneous operation of the flaps.

It is therefore an object of this invention to provide a deformable plug for use within an aircraft engine exhaust nozzel which incorporates therein a simplified actuation system for providing thrust vectoring and thrust reversing capabilities for the nozzle.

It is a further object of this invention to provide a deformable plug for use within an aircraft engine exhaust nozzle which incorporates therein a simplified actuation system for providing variable area control of the nozzle exit area.

It is still another object of this invention to provide a deformable plug for use within an aircraft engine exhaust nozzle which is economical to produce and which utilizes conventional, currently available components for the manufacture thereof.

For a better understanding of the present invention together with other and further objects thereof reference is made to the following description taken in conjunction with the accompanying drawing and its scope will be pointed out in the appended claims.

DESCRITPION OF THE DRAWING

FIG. 1 shows a partial view of the two-dimensional nozzle of an aircraft engine, showing partly in cross-section a side elevational view of the deformable plug of this invention in spaced relationship thereto, and showing one flap in phantom in the open or thrust vectoring position;

FIG. 2 shows a partial view of the two-dimensional nozzle of an aircraft engine, showing partly in cross-section a side elevational view of the deformable plug of this invention in spaced relationship thereto and showing a position of variable control of the nozzle exit area;

FIG. 3 is a sectional view taken along line III—III of FIG. 1 showing the actuation system for the vectoring-/reversing flaps located on the aft or rear portion of the deformable plug of this invention; and FIG. 4 is a sectional view taken along line IV—IV of FIG. 3 showing the jackshaft reduction gearbox mounting arrangement of the deformable plug of this invention.

DETAILED DESCRIPTION OF THE PREFERRED EMBODIMENT

Reference is now made to FIGS. 1 and 2 of the drawing which best show a typical two dimension plug nozzle system 10 for an aircraft engine having a rectangular exhaust passageway 12 of the type shown in U.S. Pat. No. 3,774,868. Located centrally within exhaust passageway 12 and in spaced relationship to the exhaust nozzle exit plane is the deformable plug 14 of this invention. Plug 14 is supported between exhaust passageway fairing extensions 16 and 18 by means of support members 20, 22 and 24.

Forming the forward fairing 26 of deformable plug 14 are a plurality of nozzle exit area control panels 28, 28', 30 and 30'. Panels 28 and 28' are pivotally attached to structural support member 20 in any conventional manner at the forward ends thereof, while the rearward ends of panels 28 and 28' are pivotally attached to the forward edges of panels 30 and 30', respectively, in a conventional manner. Panels 30 and 30' are pivotally attached to their aft edges to a pair of sway bar hinge members 34 and 36. Hinge members 34 and 36 are in turn pivotally attached to structural support member 22.

Nozzle exit area control is obtained by the inward and outward movement of panel members 28, 28', 30 and 30'. This movement is shown in FIGS. 1 and 2 of the drawing and is accomplished by the movement of linkages 32 and 32' and the withdrawal of connecting rod 33 into jackshaft 38 as best shown in FIG. 2. A jackshaft gear box assembly 40 controls this movement in a conventional manner. Rod 33, jackshaft 38 and jackshaft gear box assembly 40 are all axially located on the center line of the aircraft engine within deformable plug member 14. As shown in FIG. 2 fairing 26 which includes panels 28, 28', 30 and 30' can be moved from the position shown in FIG. 1 of the drawing to the position shown in FIG. 2 of the drawing thereby varying the nozzle exit area. This actuation system is supported by the structural support member 22 and has a conventional flexible drive means (not shown) for providing the actuation force.

Located on the aft portion of deformable plug 14 is a rear fairing 42 made up of flaps 44, 44' and support member 24. Flaps 44 and 44' are pivotally attached to the rearward edge of control panels 30 and 30', respectively, at pivot points 46 and 46'. When in the closed position, as clearly shown in FIG. 2 of the drawing, flaps 44 and 44' in combination with structural support member 24 complete the streamlined rear fairing of deformable plug 14.

Flaps 44 and 44' can be moved individually to the extended position for thrust vectoring and simultaneously for thrust reversing (as shown in phantom in FIG. 1 of the drawing) by an actuation system 48 shown in detail in FIG. 3 of the drawing. The movement of flap members 44 and 44' is accomplished by the scissors type movement of dual ball rod and clevis rod assemblies 50 and 52 driven by jackshaft reduction gear drive assembly 54 and 56, respectively. Each assembly 50 and 52 is made up of a rod 53 mounted upon threaded rod or shafts 55 which is operable in a conventional manner and shown in the extended position in phantom in FIGS. 1 and 3. The flap actuation system 48 is transversely mounted across the deformable plug 14 on roller tracks 58. Roller tracks 58 are fixedly attached to extension fairings 16 and 18 of exhaust nozzle system 10. The roller tracks are shown in detail in FIG. 4 of the drawing. Actuating force is provided to system 48 by any conventional drive mechanism (not shown) by way of flexible drive cable 60 also shown in FIG. 4 of the drawing.

During operation, actuation of nozzle area exit control panels, 28, 28', 30 and 30' cause sway bar linkages 62 to move the flap actuation system 48 axially in roller tracks 58 via the roller and attachment plate assemblies 64. This movement is transmitted through sway bar linkages 62 which are pivotally attached to the rear edge of control panels 30 and 30', respectively, and to the jackshaft reduction gear drive assemblies 54 and 56. Thrust vector control is accomplished by the independent actuation of flaps 44 or 44', as shown in FIG. 1 of the drawing while thrust control and thrust reversing is accomplished by the simultaneous operation of flaps 44 and 44' (not shown in the drawing). It is clearly evident that simplified and reliable control of the nozzle exit area as well as effective thrust vectoring thrust control and thrust reversing operations can be accomplished by the instant invention.

Although this invention has been described with reference to a particular embodiment it should be pointed out that this invention is also capable of a variety of further embodiments within the spirit and scope of the appended claims.

I claim:

1. In an engine exhaust nozzle system having an exhaust passageway made up of a pair of exhaust passageway fairing extensions, the improvement therein comprising a deformable plug fixedly positioned within the central portion of said exhaust passageway, said plug having a forward fairing and a rearward fairing, said forward fairing comprising a plurality of panels adjustably mounted with respect to said exhaust passageway, said rearward fairing comprising a pair of flaps pivotally secured to said forward fairing, means operatively connected to said forward fairing for moving said panels to a plurality of positions, means operatively connected to said rearward fairing for moving said flaps to a plurality of positions, said rearward fairing movement means being in the form of dual ball rod and clevis rod assemblies, each of said assemblies being connected to respective flaps of said rearward fairing and a gear drive assembly operatively connected to each of said ball rod and clevis rod assemblies for moving said assemblies in a scissor-like fashion thereby extending or retracting said flaps, and said forward fairing moving means and said rearward fairing moving means being interconnected whereby upon movement of said forward fairing simultaneous movement of said rearward fairing movement means takes place.

2. In an engine exhaust nozzle system as defined in claim 1 wherein said rearward fairing moving means is mounted transversely across said deformable plug on roller tracks, said roller tracks being fixedly attached to said exhaust passageway fairing extensions.

3. In an engine exhaust nozzle system having an exhaust passageway fairing extensions, the improvement therein comprising a deformable plug fixedly positioned within the central portion of said exhaust passageway, said plug having a forward fairing and a rearward fairing, said forward fairing comprising a plurality of panels adjustably mounted with respect to said exhaust passageway, said rearward fairing comprising a pair of flaps pivotally secured to said forward fairing, means operatively connected to said forward fairing for moving said panels to a plurality of positions, said forward fairing moving means being in the form of a rod and jackshaft, said rod being secured at one end by actuation linkages to said forward fairing and a jackshaft gear box assembly operatively connected to said jackshaft to provide motive force thereto in order to move said forward fairing to a plurality of positions, means operatively connected to said rearward fairing for moving said flaps to a plurality of positions, and said forward fairing moving means and said rearward fairing moving means being interconnected whereby upon movement of said forward fairing simultaneous movement of said rearward fairing movement means takes place.

4. In an engine exhaust nozzle system as defined in claim 3 wherein said rod, jackshaft and jackshaft gear box assembly are all axially located on the center line of said engine within said deformable plug.

5. In an engine exhaust nozzle as defined in claim 4 wherein said rearward fairing movement means comprises dual ball rod and clevis rod assemblies, each of said assemblies being connected to respective flaps of said rearward fairing and a gear drive assembly operatively connected to each of said ball rod and clevis rod assemblies for moving said assemblies in a scissor-like fashion thereby extending or retracting said flaps.

6. In an engine exhaust nozzle as defined in claim 5 wherein said rearward fairing moving means is mounted transversely across said deformable plug on roller tracks, said roller tracks being fixedly attached to said exhaust passageway fairing extensions.

* * * * *